United States Patent Office 3,732,265
Patented May 8, 1973

3,732,265
FLAME RETARDANTS FOR FLEXIBLE
FOAMED PLASTIC
Gerald A. Roth, Palos Hills, Ill., assignor to
Swift & Company, Chicago, Ill.
No Drawing. Filed July 30, 1969, Ser. No. 846,267
Int. Cl. C11c 3/00
U.S. Cl. 260—408                                6 Claims

ABSTRACT OF THE DISCLOSURE

Hydroxyl and halogen containing adducts obtained by reacting a hydroxy higher fatty acid ester and an aliphatic haloepoxide in the presence of an acid catalyst are produced and used to prepare flame resistant non-rigid polyurethane foams.

---

This invention pertains generally to the preparation of novel organic polyol compounds containing halogen, their use in non-rigid polyurethane foams and more particularly to the preparation of flame-resistant, non-rigid polyurethane foams.

It has previously been proposed to prepare polyurethane foam by reacting a polyhydroxy compound such as a polyester, a polyoxyalkylene glycol or similar polyols with an organic polyisocynate in a reaction mass containing a foaming agent. Polyurethane foams produced in this conventional manner have some degree of flame resistance but it has been necessary in the past to produce a foam that possesses a much higher degree of flame resistance for use in a number of systems. For example, U.S. Pat. No. 2,577,281 teaches the use of an unsaturated alkyl ester of an aryl phosphonic acid in a foamable mixture to produce a foam that has fire-resistant properties. Halogen-containing esters of phosphonic acid and phosphorous acid, ammonium chloride, ammonium phosphate, chlorinated paraffins, chlorinated polyphenyls, chlorendic acid, and chlorendic anhydride have been used as additives in foamable reaction mixtures to impart flame-resistant properties to foams. Additives of these types are not chemically bonded in the urethane polymer and are lost on aging of the foam by volatilization, leaching and migration. In addition, the use of flame proofing additives may upset the surface chemistry of the foaming system and lead to severe destruction of the internal cell structures, formation of a coarse cell structure and/or collapse of the foam during manufacturing. The difficulty in successful flame proofing urethane foams as opposed to bulk materials is further complicated by the troublesome problems of proper additive distribution at gas-solid interfacial surfaces due to the inherent physical movement of the composition during the foaming operation.

Foams made flame-resistant merely by the physical addition of additives often deteriorate on aging because the additives act as plasticizers. Deteriorization of this type also adversely affects the physical properties of the foam. For example, a halogen-containing material incorporated in a urethane foam may reduce flammability tendencies but at the same time act as a migrating plasticizer during the curing or foaming operation or in use and effect a loss of tensile strength, compression set or load bearing properties.

Polyurethane foams may be classified as rigid, semi-rigid, flexible, etc., and the art of making each particular type has been developed to a high degree. For example, in the making of polyurethane foams, various components such as surfactants, blowing agents, particular isocyanates, particular polyols, etc., have been experimented with to obtain foams having special characteristics. In the formulation of these polyurethane foams, special consideration must be given to the effect of each of the various components on the physical properties as well as the flammability characteristics.

At the present time, there are many different compounds being used to impart flame retardancy in urethanes; however, only a select few are effective when used in non-rigid urethane systems. Various percentages of chlorine, bromine, antimony or phosphorous are integral parts of these compounds and it is these elements which make the component an effective flame retardant. Some compounds contain only one of these elements while others contain two or three. These compounds fall into one of two basic classes when used in a urethane system since they are either reactive or non-reactive in reference to the isocyanate component of the system.

In addition to its normal level of flame retardant elements a reactive flame retardant in a urethane reaction can be described chemically as a compound containing one or more labile hydrogen atoms available as reactive sites. The compound below is an example of a reactive type flame retardant because the hydroxy groups provide the labile hydrogens needed for polymerization with an isocyanate.

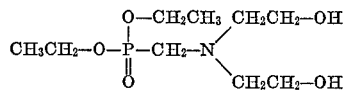

The labile hydrogen can be part of any group such as amino, hydroxyl, or carboxyl, etc., but it has to be reactive enough to react with the isocyano group of the isocyanate.

The reactive type of flame retardant additive can combine chemically with the foam and will not evaporate from the surface or leach out when the foam is completely cured. However, not all reactive compounds can be used to produce a suitable non-rigid foam. Further, the above compound has a high cross linking density and its use is limited to the rigid urethane foam systems. The addition of this type of a compound to a flexible system causes undesirable physical changes in the finished foam.

A second type of flame retardant which can be used in non-rigid polyurethane systems is a compound still containing flame retardant elements but having no hydrogen available for reaction with isocyanate groups. Such a type of compound is shown below.

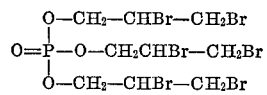

This compound is an effective flame retardant; however, its effectiveness is reduced considerably over time. This is so because it tends to evaporate and leach out due to the high surface area to weight ratio of the flexible foams.

This type of product simply adds dead weight to the foam, thus increasing the density which is an economic disadvantage since additional cost is incurred with no addtional volume of foam produced.

Incorporation of flame retardant materials in the urethane foams by chemically bonding the additives into the polymer network offers advantages over foams containing non-reactive, additive flame retardants. In this connection, it has been proposed in U.S. Pat. No. 3,206,-416 to use halogenated castor oil, namely brominated or chlorinated castor oil, as a reactive flame retardant in polyurethane foams. These materials are prepared by carrying out the halogenation of castor oil at about 50° C. to 150° C., but preferably from 80° C. to 130° C. The halogenated oils obtained in this manner have a viscosity of 800–2000 cp./25° C., hydroxy numbers from 97 to 129, and acid numbers from 33.41. These halogenated castor oils produce flame resistant polyurethane foams but possess the disadvantage of themselves being chemically unstable at ambient temperatures or temperatures in the range of 15° C. to 40° C. Use of these halogenated oils in polyurethane foam preparations is then limited since the physical properties of the compound that are important for imparting desired properties to the polyurethane foam, especially viscosity, hydroxyl number, acid number and color, change substantially on aging at ambient temperatures. For example, brominated castor oil prepared in the aforementioned fashion undergoes a decrease of hyroxyl number and a parallel increase in acid number during aging. The use of halogenated castor oils as reactive flame retardant polyols in polyurethane foams suffers from the disadvantage of having physical properties constantly changing on aging. A mixture that is formulated using these halogenated oils as the polyol constituent may not be foamable since the large concentration of acid may effectively neutralize the small amount of amine and organic-metallic catalysts that are often added to catalyze the urethane reactions.

While most of the reactive flame retardants on the market today are designed for the rigid systems, manufacturers are constantly seeking new constituents for the flexible urethane foam market. However, several difficulties are apparent when trying to apply rigid foam flame retardants to flexibles. If a flame retardant could be designed much like one of the main components of the foam, then it could be substituted into the foamable composition to give a minimum of adverse effects.

Accordingly, it is one object of this invention to prepare new compositions of matter having these desirable combinations of physical and chemical properties.

It is another object of this invention to provide a method for making flame resistant polyurethane foam which will remain so even after prolonged aging periods.

Another object of this invention is the production of halogenated fatty acid ester derivatives that possess stability and physical properties that remain essentially unchanged upon aging.

Additional objects, if not specifically set forth herein, will be readily apparent to those skilled in the art from a reading of the detailed description of the invention which follows.

In general, the novel compounds of this invention are hydroxy and halogen containing ether adducts derived from hydroxy higher fatty acid esters of low molecular weight polyols and haloepoxides. These compounds are produced by reacting a polyhydric alcohol ester of a hydroxy fatty acid (hereinafter referred to as the "polyol ester" reactant) with a haloepoxide in the presence of an acidic catalyst to produce an adduct having a controlled degree of functionality. In one preferred embodiment, an epihalohydrin is added to a reaction mass comprising a mixture of the "polyol ester" and catalyst so as to get increased amounts of polymerization of the epihalohydrin on the ester reactant. The adducts of this invention are multi-functional polyols and are used as the major building blocks in various urethane foams.

Chemical modification of these adducts results in changes in the behavior and properties of the resulting foams. The adducts can be prepared from inexpensive raw materials and can be tailor-made to suit desired molecular weight, viscosity and hydroxyl number conditions. For semi-rigid foams, the hydroxyl value range is about 100–300 and flexible foams have a requirement of between about 25 and 100. Generally speaking, the adducts of this invention will possess a molecular weight of between about 1500 and about 7500 with a 2500 to 3500 range preferred. The adducts will possess a hydroxy value range of between about 25 and about 300 with a preferred range of 30 to 100.

The hydroxyl and halogen containing ether adducts of this invention are products obtained by reacting aliphatic haloepoxides with a particular polyol ester to produce polyethers containing chemically combined hydroxyl and halogen in the polyether unit of the molecule. The reaction is carried out at temperatures between about 30° C. and 150° C. in the presence of an acidic catalyst, preferably of the Lewis acid type. Typical catalysts are $BF_3$, $SnCl_4$, $AlCl_3$, $TiCl_4$, etc., used in amounts of about .01% to 3% based on the weight of the polyol ester reactant. The reaction time to prepare the adduct will vary depending upon the temperature of the reaction, the reactants employed, and the amounts thereof. Generally, however, a reaction time in the range of between about 30 minutes and 100 hours is utilized.

The polyol ester reactant which is reacted with the haloepoxide can be saturated or unsaturated, non-substituted or substituted with non-interfering groups, and is a higher fatty hydroxy acid ester of a polyhydric alcohol wherein the alcohol portions contain about 2–6 carbons and about 2–6 hydroxyl groups. The term "higher fatty hydroxy acids" as used herein refers to fatty acids either saturated or unsaturated, straight or branched chained of about 8 to about 30 carbon atoms (10 to 22 carbon atoms preferred) and contain one or more hydroxyl groups per acyl radical of the ester molecule. Included broadly are hydroxy containing triglycerides, diglycerides and monoglycerides. Castor oil is an example of a naturally occurring unsaturated polyol ester while the ethylene glycol ester of ricinoleic acid is an example of a synthetic, unsaturated polyol ester. Saturated polyol ester reactants are typified by the 9-hydroxy stearic acid ester of pentaerythritol. Suitable low molecular weight polyhydric alcohols that make up the polyol ester reactant are selected from the glycols, triols, tetraols, pentols and hexols and are represented by ethylene glycol, glycerol, pentaerythritol, sorbitol, etc. Since these low molecular weight polyhydric alcohols are multi-functional, it is possible that the hydroxyl function be present on only some of the acyl radicals making up the polyol ester reactant.

The aliphatic haloepoxides that can be reacted with the polyol ester reactant to form the hydroxy and halogen containing ether derivatives of the hydroxyl fatty acid esters are those saturated or unsaturated aliphatic $C_3$-$C_{10}$ straight or branched chain haloepoxides. The halogen constituent of the epoxide is preferably a chlorine or bromine atom but iodine and fluorine are contemplated. Examples of preferred reactants are epichlorohydrin and epibromohydrin. Further, the epoxide molecule, if desired, can be substituted with more than one halogen, e.g., 1,4-dichloro-2,3-epoxyoctane.

At this point it should be mentioned that it is old in the art to react halogenated epoxides with glycols and other low molecular weight materials to produce polyols and that these polyols in turn are known to be used in polyurethane foam systems. However, it has been found that the reaction product of the hydroxy higher fatty acid esters and the halogenated epoxides of this invention are far superior to the low molecular weight materials; such as the reaction product of glycol and epibromohydrin. The long chain fatty group is believed to impart plasticization to flexible and semi-rigid foams, and this desirable property is not apparent when the small chain derivatives are used. In addition, triglyceride esters of hydroxy fatty acids produce superior results believed to be due to the three functionality of the molecule.

Generally speaking, when preparing adducts for flexible foams at least about 7 and up to about 100 moles of haloepoxide is reacted with each mole of polyol ester reactant. It is preferred, however, to react about 2–2.5 to 20 moles of haloepoxide per each hydroxy function in the polyol ester reactant. For example, using epichlorohydrin, about 7 to about 60 moles of epichlorohydrin are reacted with 1 mole of castor oil (2–2.5 to about 20 mols of epichlorohydrin per each hydroxy function). When using epibromohydrin about 7 to about 45 moles of epibromohydrin are reacted with each mole of castor oil (2–2.5 to about 15 moles of epibromohydrin in per each hydroxy function). In this connection, the term "moles reacted" means chemically combined with and does not include side reactions, i.e., some moles that are used up in homopolymerization of the haloepoxide.

As is well know to those skilled in the art, the polyols are the major building blocks of the urethane foams and are generaly the ingredient upon which the behavior and properties of the foam depend. The chemical characteristics of the polyols necessary to achieve a foam with the right physical characteristics have been defined quite carefully. An ideal polyol for producing flexible urethane foam has a hydroxy value of approximately 56 and molecular weight of approximately 3,000. With these values in mind, it is possible by using the instant invention to design a compound having the desirable characteristics and yet contain a large amount of flame retardant elements. For example, epichlorohydrin can be reached with castor oil in the presence of $BF_3$ as a catalyst. This product basically is a triglyceride which has had its glyceride chains lengthened first by reacting epoxide groups with hydroxyls of the ricinoleic acyl radical, then by subsequent polymerization of epochlorohydrin onto the new hydroxyl groups. The molecular weight can be controlled simply by the amount of epichlorohydrin added to the product. Pictured below is this type of polymerization.

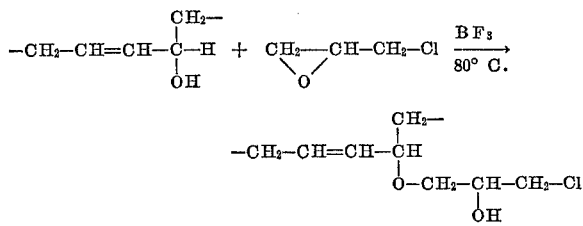

The resulting product is one of approximately 3,000 molecular weight and can be represented by the formula below:

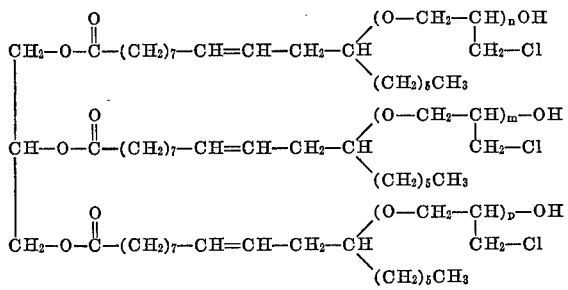

The sum of *nmp*, necessary to make an average molecular weight of 3000 gms. is approximately equal to 21. A slight modification of this product is to use epibromohydrin with castor oil in exactly the same way as epichlorohydrin. The most suitable product of this type for use in flexible foams is pictured below.

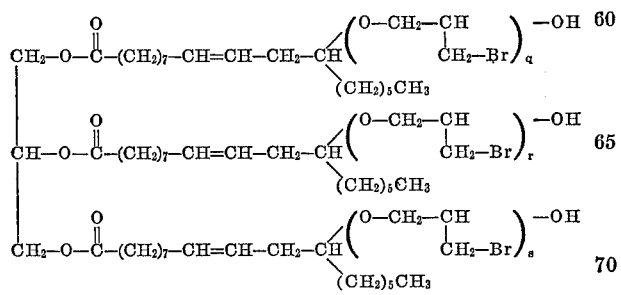

The sum of *grs* necessary to make an average molecular weight of 3000 is approximately equal to 15.

Although polymerization is mainly in the direction shown

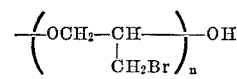

some (perhaps 15% or more) goes the opposite way

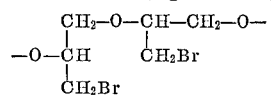

The following general formula can be used to illustrate one embodiment of the invention and when this formula is used, both in the specification and claims, it is intended to cover both forms of polymerization:

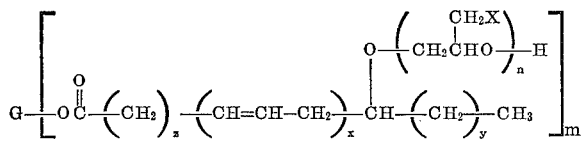

wherein G is a monovalent to hexavalent alkyl group and usually hydrocarbon, z is an integer of 0 to 7, x is an integer of 0 to 3, y is an integer of 0 to 7, n is an integer of 2.5 to 50, m is an integer of 1 to 6 and X is halogen and usually –Cl, –Br or –I and the sum of x, y and z are such that an acyl radical contains at least about 8 carbon atoms.

The products of this invention combine the advantages of the previously mentioned flame retardants. The novel compositions of matter do not leach out or evaporate like the non-reactant polyols, nor do they impart physical changes like other reactive flame retardants. They give a very high degree of flame retardancy to the flexible foam. A still further advantage is that the compounds of this invention have multiple functionality and that the compounds are quite versatile in forming new compounds of desired characteristics.

It should be noted that the unsaturation of the triglyceride provides a means for controlling the halogen content of the molecule. This fact will be emphasized later in the disclosure. These products can be treated with short chain aliphatic oxides, such as ethylene, propylene or butylene oxide, to increase the molecular weight. It should also be noted that treatment of the polyol adduct with an alkylene oxide converts the secondary alcohol function to a primary alcohol function which is much more reactive.

When it is desirable to halogenate the hydroxy and halogen containing ether derivatives of the higher fatty esters of this invention, the unsaturated portion of the triglyceride can be most effectively halogenated by contacting the unsaturated polyol adduct with free halogen (usually chlorine or bromine). A suitable solvent can be used, if necessary, to moderate the reaction.

The addition of the halogen should be conducted at a sufficiently low temperature to avoid decomposition of the product. Thus, during addition of the halogen, reaction mixture temperatures should be kept below about 30° C. In many cases, it may be found best to maintain the reaction at low temperatures, i.e., in the range of about a –10° C. to about 20° C. during the addition of the halogen and then warm the mixture to a higher temperature to assure complete reaction. Particular suitable solvents for the halogenation reaction include petroleum ether, hexane, benzene, toluene, xylene, or two phase systems using solvent and water or water-alcohol mixtures.

Halogenation of the olefinic double bond results in halogen atoms on adjacent carbons. Since the halogen reacts substantially with the unsaturated bonds, it is generally only necessary to add a stoichiometric amount of halogen if one desires to obtain an essentially pure product. In many cases, it has been found that little or no side reactions occur so that a sufficiently pure product will be obtained by simply stripping off the solvent from the final reaction mixture, preferably used in sub-atmospheric pressure as necessary to avoid thermo decomposition of the product. If an extra pure product is required, it can easily be obtained by extraction, distillation, or other known means for purifying organic compounds.

The unsaturated portion of the glyceride adducts can be halogenated so that about 99–50% of the unsaturation remains. Accordingly, it can be seen that one can add bromine and cut back on the amount of epibromohydrin used to form the adduct.

For example, by proper manipulation of the quantity of epibromohydrin and bromine used, it is possible to make compounds (polyols) that have high bromine and high hydroxyl content. This also allows for a much finer adjustment of bromine and hydroxyl to nearly any desired ratio. When the "polyol ester" is reacted with epibromohydrin three carbon atoms, five hydrogen atoms and one oxygen atom are added to the molecule for each bromine atom. Furthermore, the molecular weight is increasing by an amount of those carbons, hydrogen and oxygen to decrease the hydroxyl value of the product. By brominating the double bonds, the bromine content can go up immediately and nothing else contributes to the molecular weight change.

By way of example, it should be noted that brominated castor oil has a hydroxyl value of about 100 and a bromine content of about 31%. Brominated castor oil by itself, however, has very little utility in urethane foam systems because of its instability. It darkens and builds up acid on storage, especially at higher temperatures. By proper adjustment of the amount of epibromohydrin and bromine used, one can make, as taught by this invention, a product that has the same hydroxyl and bromine content as brominated castor oil, but is not unstable, has a low acid value and good color. Further, the product retains these desirable features over long periods of time.

As discussed above, an outstanding use for the novel polyol adducts of this invention is in providing flame resistance for isocyanate or polyurethane foams. The term "flame-resistant" is used to characterize a material which does not burn readily. The polyol adducts may be used individually or in various mixtures and combinations with other hydroxy containing reactants. Due to the fact that these compositions possess multiple hydroxy groups, the compounds actually react with the isocyanates in the formation of urethane foams to produce flame resistant copolymers. In this respect, they may replace some or all of the polyols generally used in such formulations.

The production of polyurethane foams is well known, and a detailed description of such processes is not warranted here. Briefly, however, the process involves the reaction of an isocyanate and another polyfunctional compound which contains an active hydrogen, i.e., hydroxy, carboxyl, amino groups, etc.

Actual utility of the flame-resistant foams is typified by the technique of foam-in-place insulation. Such insulation has been used in automobiles, refrigerators and aircraft where the foams add strength as well as fire resistance to the various components. The degree of cross-linking and the type of polyols used determines whether the final product is rigid or flexible. Since the polyols of this invention may replace all or only a part of the normally used polyols, they are thus adaptable for use in either flexible or semi-rigid foams.

The invention contemplates either a prepolymer process or a one-shot process for making polyurethane foams. In the prepolymer process, the polyol adduct with or without another polyhydric polyalkylene ether is heated under substantially anhydrous conditions with an excess of organic polyisocyanate to form a cyano terminated adduct. This adduct is then reacted with additional polyol amino compound or water in a second step to produce a foam. In a one-shot process, the organic polyisocyanate, the polyol adduct and other ingredients of the foamable mixture are all mixed together substantially simultaneously.

In its broadest aspects, the invention contemplates the preparation of polyurethane foams using the adducts of this invention as the sole polyol component of the polyurethane foam. Also, the adducts can be a constituent of a polyol mixture of two or more polyols used to prepare a polyurethane foam. Other polyols that can be used in this fashion to prepare fire retardant polyurethane foams are polyoxypropylene glycols, polyoxytetramethylene glycols, and polyoxybutylene glycols. These polyols are preferred to be polymerized adducts of propylene oxide, tetrahydrofuran, 1,2- or 2,3-butylene oxide or the like with ethylene glycol, trimethylolpropane, pentaerythritol, 1,2,-6-hexanetriol, 1,4-butanediol, sorbitol, mannitol, propylene glycol, sucrose, diethylene glycol, glycerine or the like. A polyalkylene glycol that has a hydroxy content of about 1 to 3% and a molecular weight of about 2,000 to 5,000 is preferred for the preparation of soft or flexible foams.

Other alchools that are not of a polymeric nature that might be employed as constituents of a polyol mixture that includes the adducts of this invention are the following: diethanolamine, triethanolamine, triisopropanolamine, diisopropanolamine, pentaerythritol, trimethanolpropane, glycerine or the like. It is preferred that these low molecular alcohols be at least difunctional and preferably tri or tetrafunctional and they can comprise from 5% to 75% by weight of the total polyol mixture. It is understood that the amount of polyoxyalkylene glycol or monomeric alcohol used in a polyol mixture, along with the adducts of this invention will depend upon the physical properties and degree of flame retardancy desired in the polyurethane foam.

Any desirable organic di or polyisocyanate can be used as the isocyanate component for the preparation of polyurethane foams. Organic polyisocyanates that can be used are 2,4-toluene diisocyanate, 2,6-toluene diisocyanate, and mixtures of the two ingredients, xylene-1, 3-diisocyanate, xylene-1, 4-diisocyanate, dodecamethylene diisocyanate, undecamethylene diisocyanate, pentamethylene diisocyanate, ethylene diisococyanate, 4,2'-diphenylmethane, diiosocyanate, m-phenylene diiosocyanate, cyclohexylene-1, 4-diisocyanate, p-isocyantobenzyl isocyanate or the like.

Polyurethane foams can be manufactured in accordance with this invention by any suitable manipulative step or technique. Halogenoalkanes or other gases can be included in the foam formulation to effect the blowing of the foam. Dichlorodifluoroethane, trichlorofluoromethane, trichlorotrifluoroethane and other halogenalkanes, as well as inert gases like nitrogen or the like can be used alone or with water to form the porous foam structure. Water can be used alone in the reaction mixture to react with the polyisocyanate to form carbon dioxide which becomes entrapped in the reaction mixture to form the porous product. Any suitable amount of water, such as 0.1 to 7 parts water per 100 parts polyol of adduct, can be used.

Any suitable activator in an amount of about .01% to 2%, by weight basis adduct, such as stannous oleate, stannous octoate, triethylenediamine, dibutyltin, dilaurate, tetramethyl 1,3-butanediamine, N-ethylmorpholine, piperazine, or the like can be used. Emulsifiers and surfactants such as silicone oils and soaps can be used to improve the cell structure of the foam.

The compositions of this invention are particularly advantageous for the preparation of flame-resistant polyurethane foams since they are stable polyols at ambient temperatures and produce polyurethane foams that are uniform, contain no blow holes or cracks, show little or no tendency toward brittleness, do not shrink excessively on aging, have low density, and possess very good flame resistant properties. The polyol adduct prepared in accordance with this invention have low acid numbers and consequently do not necessitate the inclusion of amino alcohols or amines in the polyol mixture. The polyurethane foam which is made in accordance with this invention can be used for making chair and seat cushions and for insulation materials for buildings, hot water tanks, home refrigerators, refrigerated trucks, and refrigerated railroad cars.

The following examples are set forth as illustrated embodiments of the invention and are not to be taken in any manner as limiting the scope of the invention.

EXAMPLE I

Reaction of epichlorohydrin with castor oil in the presence of boron trifluoride Approximately 1,000 grams of dry castor oil was charged into a reactor equipped with adequate agitation means. Seven grams of boron-trifluoride-etherate was then added and the mixture stirred vigorously. Then 1000 grams of epichlorohydrin was added slowly with agitation so that its rate of addition did not cause the reaction temperature to exceed 40° C. After 1000 grams of epichlorohydrin had been added, 3.5 grams of additional boron trifluoride complex was added. Then an additional 500 grams of epichlorohydrin was added in the same slow manner. After the addition was complete, 3½ grams of (3.5) boron trifluoride complex was added again. Then the last 500 grams of epichlorohydrin was slowly added. The product was washed free of boron trifluoride by adding 3000 grams of a 10% aqueous urea solution to the product in the reactor under mild agitation. It was agitated for 4 hours until the oil had taken on a yellow opaque color. The wash water was drawn off and the oil rinsed with 4–3000 gram portions of tap water. The product was then allowed to settle for 24 hours and the excess water drawn off. It was then processed in a suitable thin film evaporator at 150° C. jacket temperature at reduced pressures to remove the last traces of moisture. The product was filtered and collected in suitable vessels. The product had a dark brown or reddish-brown color and had an approximate viscosity of 100 poises at room temperature.

EXAMPLE II

The ester of ricinoleic acid and pentaerythritol reacted with epibromohydrin in presence of $SnCl_4$ Approximately 4 moles (1192 grams) of ricinoleic acid was charged into a reactor with 5 grams of concentrated hydrochloric acid. One mole (136 grams) of pentaerythritol was added with 2 moles (160 grams) of benzene and the solution refluxed with heat. After 4 hours of refluxing the solvent was stripped off in a rotary evaporator under vacuum. The product was washed with a 5% sodium hydroxide solution to remove traces of catalyst and unreacted acid. After successive washings with water the product was taken up in ether and separated from the water layer. It was then stripped of solvent and water in a rotary evaporator.

Approximately .75 mole (1000 grams) of this ester was then charged into a suitable glass lined reactor and agitated. Approximately 7 grams of stannic chloride was added and the mixture stirred vigorously. Then 1000 grams of epibromohydrin was added very slowly with agitation so that its rate of addition did not cause the reaction temperature to exceed 40° C. After 1000 grams of epibromohydrin had been added 3.5 grams of stannic chloride was added. Then an additional 500 grams of epibromohydrin was added slowly. When this addition was complete 3.5 grams of stannic chloride was again added to the reaction mixture. Then the last 500 grams of epibromohydrin was slowly added. The product was washed free of stannic chloride by adding 3000 grams of a 10% urea water solution to the product in the reactor under mild agitation. It was agitated for 4 hours until the oil had taken on a yellow opaque color. The wash water was drawn off and the oil was rinsed with 4–3000 gram portions of tap water. The product is allowed to settle for 24 hours. It was then run through a suitable thin film evaporator at 150° C. jacket temperature at vacuum pressure to remove the last traces of water.

EXAMPLE III

The ester of ethylene glycol and ricinoleic acid reacted with epibromohydrin in the presence of boron trifluoride catalyst Approximately 2 moles (596 grams) of ricinoleic acid was charged into a reactor with 5 grams of concentrated hydrochloric acid. Then 1 mole (62 grams) of ethylene glycol was added with 1 mole (80 grams) of benzene and the solution refluxed. After 4 hours of refluxing the solvent was stripped in a rotary evaporator under vacuum. The product was washed with a 5% sodium hydroxide solution to remove traces of catalyst and unreacted acid. After successive washings with water the product was taken up in ether and separated from the water layer. It was then stripped of solvent and water in a rotary evaporator. Approximately 1.5 moles (1000 grams) of this ester was then charged into a suitable glass lined reactor and agitated. Approximately 7 grams of boron trifluoride ether complex was added and the mixture stirred vigorously. Then 1000 grams of epibromohydrin was added very slowly with agitation so that its rate of addition did not cause the reaction temperature to exceed 40° C. After 1000 grams of epibromohydrin had been added 3.5 grams of boron trifluoride was added. Then an additional 500 grams of epibromohydrin was added slowly. When this addition is complete 3.5 grams of boron trifluoride ether complex was again added. Then the last 500 grams of epibromohydrin was added. The product was washed free of boron trifluoride by adding 3000 grams of 10% urea-water solution to the product in the reactor under mild agitation. It was agitated for 4 hours until the oil had taken on a yellow opaque color. The wash water was drawn off and the oil rinsed with 4–3000 gram portions of tap water. The product was allowed to settle for 24 hours and the wash water was drawn off the top. It was run through a suitable thin film evaporator at 150° C. jacket temperature at vacuum pressure to remove the last traces of water and solvent.

EXAMPLE IV

The ester of trimethylol propane and ricinoleic acid reacted with epichlorohydrin in the presence of stannic chloride Approximately 3 moles (894 grams) of ricinoleic acid was charged into a reactor wth 5 grams of concentrated hydrochlorc acid. One mole (134 grams) of trimethylol propane was added with one mole (80 grams) of benzene and the mixture refluxed by heating. After four hours of refluxing, the solvent was stripped off in a rotary evaporator under vacuum. The product was washed with a 5% sodium hydroxide solution to remove traces of catalyst and unreacted acid. After successive washings with water the product was taken up in ether and separated from the water layer. It is then stripped of solvent and water in rotary evaporator. Approximately one mole (100 grams) of this ester was then charged into a suitable glass lined reactor and agitated. Approximately 7 grams of stannic chloride was added and the mixture stirred vigorously. Then, 1000 grams of epichlorohydrin was added very slowly with agitation so that its rate of addition did not cause the reaction temperature to exceed 40° C. After this addition, 3.5 grams of stannic chloride was added. Then, an additional 500 grams of epichlorohydrin was added slowly. After this addition was complete, 3½ grams of stannic chloride was added to the reaction mixture while it was being agitated. Then the last 500 grams of epichlorohydrin was added slowly. The product was washed free of stannic chloride by adding 3000 grams of 10% urea-water solution to the product in the reactor under mild agitation. It was agitated for 4 hours until the oil had taken on a yellow opaque color. The wash water was drawn off and the oil was rinsed with 4–3000 gram portions of tap water. The product was allowed to settle for 24 hours and the rinse water was

EXAMPLE V

Unsaturated fatty acid esters treated with hypochlorous acid subsequently polymerized with epichlorohydrin in the presence of boron trifluoride Approximately one mole of soybean oil was charged into a reactor with suitable agitation. Then, three moles of hypochlorous acid was added and the reaction mixture agitated vigorously. The mixture was heated with agitation for three hours to insure complete reaction. The product was then washed four times with tap water to eliminate traces of unreacted hypochlorous acid and by-products. The water was allowed to settle out for about 24 hours and the product was mixed with 100 grams of benzene and run through a rotary evaporator to eliminate traces of water and benzene.

Approximately 1000 grams of this ester was charged into a suitable glass lined reactor and agitated. Approximately 7 grams of boron trichloride was added and the mixture stirred vigorously. Then 1000 grams of epichlorohydrin was added very slowly with agitation so that its rate of addition did not cause the reaction temperature to exceed 40° C. After 1000 grams of epichlorohydrin had been added, 3½ grams of boron trifluoride was added. Then, an additional 500 grams of epichlorohydrin was added slowly. After this addition was complete 3½ grams of boron trifluoride was added as the mixture was being agitated. The product was washed free of boron trifluoride by adding 3000 grams of 10% urea-water solution to the product in the reactor under mild agitation. It is agitated for 4 hours until the oil had taken on a yellow opaque color. The wash water was drawn off and the oil rinsed with 4–3000 gram portions of tap water. The product was allowed to settle for 24 hours so that all the water could come to the surface. The water was drawn off and the product run through a suitable thin film evaporator in 150° C. jacket temperature at vacuum pressure to remove the last traces of water.

EXAMPLE VI

The reaction of castor oil with epibromohydrin in the presence of boron trifluoride followed by subsequent polymerization with propylene oxide in presence of boron trifluoride catalyst Approximately 1000 grams of dry castor oil was charged into a reactor equipped with adequate agitation means. Fourteen grams of boron trifluoride ether complex was added and the mixture stirred vigorously. Then, 2000 grams of epibromohydrin was added slowly enough with agitation so that its rate of addition did not cause the reaction temperature to exceed 40° C. After 2000 grams of epibromohydrin had been added, 7 grams of boron trifluoride was added. Then an additional 2000 grams of epibromohydrin was added slowly while under agitation. After this addition was complete 7 grams of boron trifluoride was added. After this addition was complete the mass was allowed to agitate for 2 hours without addition of any further components. Then, slowly the addition of 1000 grams of propylene oxide was started. This addition was conducted slowly so as to prevent any overheating. The product was washed free of boron trifluoride by adding 6000 grams of a 10% urea-water solution to the product in the reactor under mild agitation. It was agitated for 4 hours until the oil had taken on a reddish opaque color. The wash water was thrown off and the oil rinsed with 4–3000 gram portions of tap water. The product was allowed to settle for 24 hours so that all the water could come to the surface. The water was removed and the product run through a suitable thin film evaporator at 105° C. jacket temperature at vacuum pressure to remove the last traces of water.

EXAMPLE VII

One hundred pounds of dry castor oil was added to 300 lbs. of epibromohydrin and mildly agitated in a stainless steel reactor equipped with suitable heating and cooling facilities. The temperature of the reaction mixture was brought up to 160° F. ±5° and held there for a brief time until catalyst addition commenced. A pre-blended catalyst made up of benzene and boron trifluoride etherate was added very slowly to the reaction mixture. The amount of boron trifluoride etherate was 1% of the total reactants while the amount of benzene can vary anywhere from 1 to 10 or 15 times the weight of the boron trifluorate. The purpose in using increasing amounts of benzene was to minimize the possibility of adding too much catalyst at one time. The catalyst was added over a 2–4 hour period depending on how well the cooling facilities could maintain the temperature at 185° F. ±10° F. with the reaction exotherm. When the reaction was over the temperature began to fall. The reaction was allowed to continue for a total of 5 hours. That is, 5 hours was the total reaction time starting from the point of catalyst addition. At the end of 5 hours the product was washed with an equal volume of 10% urea-water solution. One washing with this solution was followed with two of tap water. The oil was allowed to settle for a few hours followed by stripping off solvent and water in a thin film evaporator.

EXAMPLE VIII

Example of one shot system using invention adduct as the only polyol

One hundred forty-four grams of the product produced by Example VII was mixed with 2.5 parts of silicone surfactant (Union Carbide L-520), .5 part of a 33% solution of triethylene diamine, 1.4 parts of N-ethyl morpholine, .26 part of stannous octoate, and 4.0 parts of water. These chemicals were blended quickly and as completely as possible. 52.2 grams of toluene diisocyanate was subsequently added with vigorous mixing. In about 15 seconds frothing began and the blend was poured into a mold and allowed to cure. Various rates of cure were affected by catalyst adjustment.

EXAMPLE IX

Example of one shot system using invention adduct as a supplemental polyol

Forty grams of a polyalkylene ether polyol, M.W. 3000, was blended with 14 grams of product produced by Example I, 1.5 grams L-520, a silicone surfactant, .2 part N-ethylmorpholine, .25 gram of a 33% solution of triethylene diamine, .13 part stannous octoate and 2.0 parts of water. After a few seconds of vigorous blending 26.1 grams of toluene diisocyanate was added with additional blending. In about 15 seconds frothing began and the blend was poured into a mold and allowed to cure. Rates of cure were dependent on catalyst concentration.

EXAMPLE X

This is example of the product made by Example I as an intermediate which is subsequently brominated One hundred grams of the adduct formed by the procedure of Example I was blended with 50 grams of water and 25 grams of petroleum ether and mildly agitated in a glass-lined vessel equipped with suitable cooling facilities. An iodine value was taken on the oil previously and was used to calculate the amount of bromine to be added. About 10±1.0 grams was added slowly to the reaction mixture at a maintained temperature below 30° C. When all the bromine was added, agitation was stopped and the water layer allowed to separate. The oil was drawn off and solvent and water stripped off in a thin film evaporator. This product was subsequently used in the same type of application as the unbrominated product.

Obviously, many modifications and variations of the

What is claimed is:

1. A novel composition of matter represented by the formula:

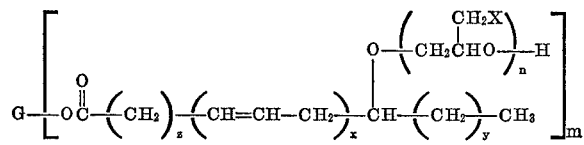

wherein G is an alkyl group of 3 to 6 carbon atoms, z is an integer of 0 to 7, x is an integer of 0 to 3, y is an integer of 0 to 7, n is an integer of 2 to 50, m is an integer of 3 to 6, X is halogen and the sum of x, y and z is such that at least one acyl radical has at least 8 carbon atoms and the sum of n's is at least 7.

2. The composition of claim 1 wherein the sum of n's is at least 15.

3. The composition of claim 1 wherein m is 3.

4. The composition of claim 1 wherein the formula represents a compound selected from the group consisting of epibromohydrinated castor oil and epichlorohydrinated castor oil.

5. The composition of claim 1 wherein x is an integer of 1 to 3 and the product is halogenated so that about 99%–50% of the unsaturation remains.

6. The composition of claim 1 wherein some of the hydroxyl functions have been alkoxylated with a member selected from the group consisting of ethylene oxide, propylene oxide and butylene oxide.

References Cited

UNITED STATES PATENTS 2,542,550    2/1951    McDermott _____ 260—410.7

OTHER REFERENCES

Netherlands appl. 6602411, Aug. 25, 1966.
Chem. Abst., vol. 66 (1967), 19048 F.

LEWIS GOTTS, Primary Examiner
C. L. MILLS, Assistant Examiner

U.S. Cl. X.R.

260—2.5 AN